United States Patent [19]

Decker

[11] E Re. 28,758

[45] Reissued Apr. 6, 1976

[54] METHOD AND APPARATUS USED FOR BOOK BINDING

[76] Inventor: William R. Decker, 2316 Cameron, Covina, Calif. 91722

[22] Filed: June 11, 1974

[21] Appl. No.: 478,240

Related U.S. Patent Documents

Reissue of:

[64] Patent No.: 3,717,366
Issued: Feb. 20, 1973
Appl. No.: 155,771
Filed: June 23, 1971

[52] U.S. Cl. ..... 281/21; 11/1 R; 270/86
[51] Int. Cl. ..... B42d 1/00; B42d 19/00
[58] Field of Search ..... 11/1, 3; 281/21, 29

[56] References Cited

UNITED STATES PATENTS

| | | | |
|---|---|---|---|
| 1,931,244 | 10/1933 | Alger et al. | 11/1 AD |
| 2,824,541 | 2/1958 | Paulsen | 11/1 R X |
| 3,210,093 | 10/1965 | Steidinger | 281/21 R |
| 3,532,363 | 10/1970 | Abildgaard et al. | 11/3 X |
| 3,548,431 | 12/1970 | Hall et al. | 11/1 AD |

*Primary Examiner*—Lawrence Charles
*Attorney, Agent, or Firm*—Gordon L. Peterson

[57] ABSTRACT

Fundamentally, the invention pertains to a method and apparatus to be used in binding books. The apparatus may be constructed relatively small and portable, and may be used in offices and print shops where binding machines of the prior art are not practical due to size, expense, and complexity of operation and their inadaptability to small lot binding activity. The relatively small size and portability of the apparatus is made possible by a method of inserting into the book cover, a hot melt adhesive in cool hard form and melting the adhesive material by applying heat externally to the book cover to be bound. The apparatus therefore, comprises a number of devices in combination including a heating rack to heat the binding edge of the book, a cooling rack to cool the edge of the book cover, a mechanism that folds the book cover, and a device that adjusts the folding mechanism so as to fold the book cover in such a way as to accommodate the thickness of the collated pages to be bound.

16 Claims, 8 Drawing Figures

METHOD AND APPARATUS USED FOR BOOK BINDING

Matter enclosed in heavy brackets [ ] appears in the original patent but forms no part of this reissue specification; matter printed in italics indicates the additions made by reissue.

SUMMARY OF THE INVENTION

The invention involves a method of placing inside a folded book cover, an adhesive material, in cool hard form, which material, when heated, possesses the characteristic of melting to a semi liquid state and when subsequently cooled hardens to a flexible semi solid state.

Although the use of a hot melt adhesive binding material is common to the book binding art, in all prior art methods utilizing such adhesive, the adhesive is applied in hot semi liquid form to the inside surface of the book cover, followed by implanting into the still molten adhesive, the collated book pages to be bound. The invention claimed involves a method of applying the hot melt adhesive in cold hard form to the inside of a folded book cover, inserting the book pages to be bound, then heating the adhesive material to a semi liquid state by application of heat to the outside of the book cover, permitting the heat to be transmitted through the book cover to the adhesive material, the adhesive thereby melting and flowing into the edges of the book pages by capillary action, and onto the book cover by gravitation, thereby binding the pages to each other and to the book cover when the adhesive material is cooled. The applicant also claims, in combination, an apparatus to apply heat to the outside of the book cover, an apparatus to hold the book in shape while cooling the adhesive, an apparatus to fold the book cover, and a device to measure the thickness of the collated pages to be bound, which device automatically adjusts the folding apparatus for a single or double folding of the book cover to accommodate the thickness of the collated pages to be bound.

DETAIL DESCRIPTION

Figure 1:
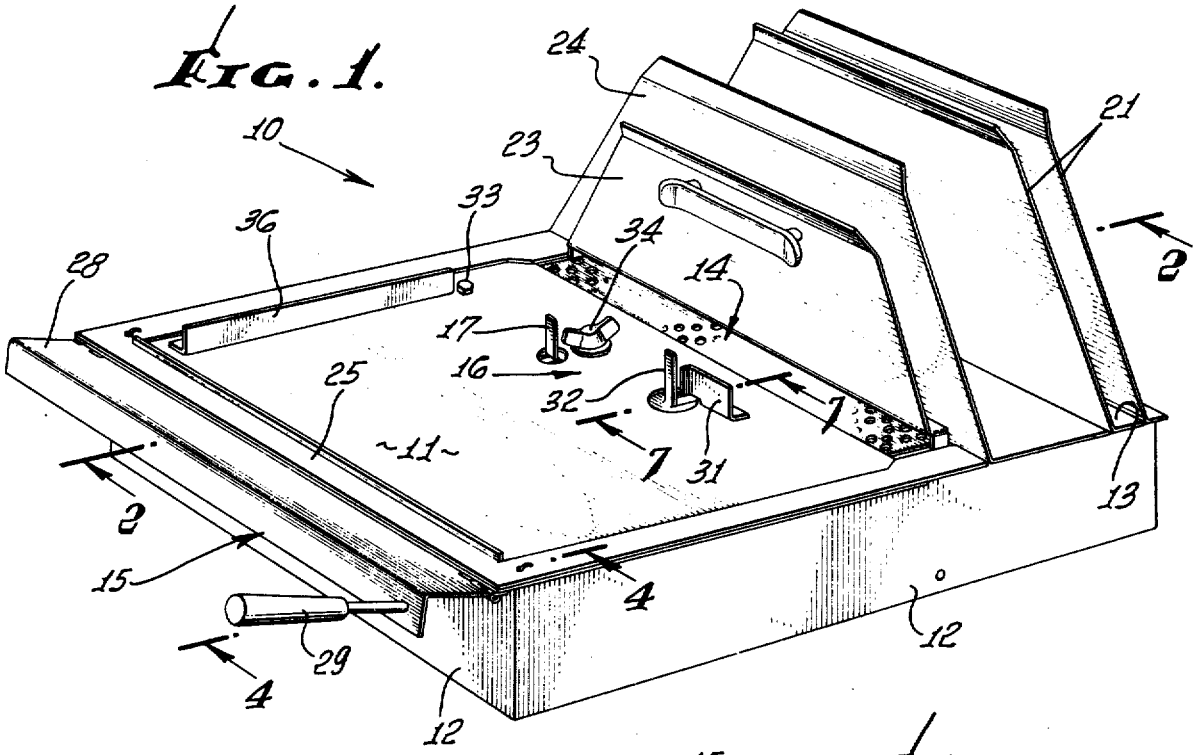
FIG. 1 is a perspective view of the binding machine.
Figure 4:
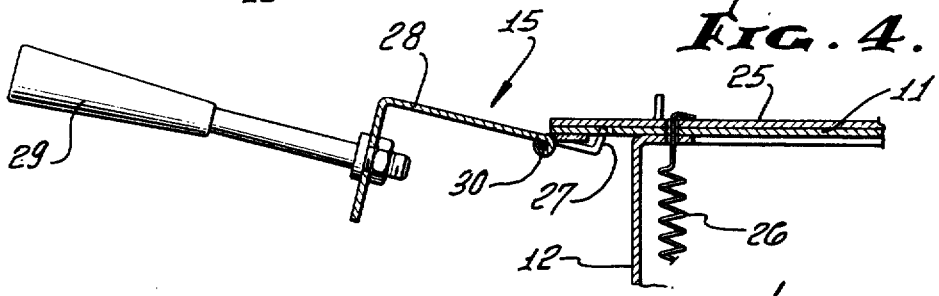
FIG. 4 is a section taken along the plane 4—4 of FIG. 1.
Figure 5:
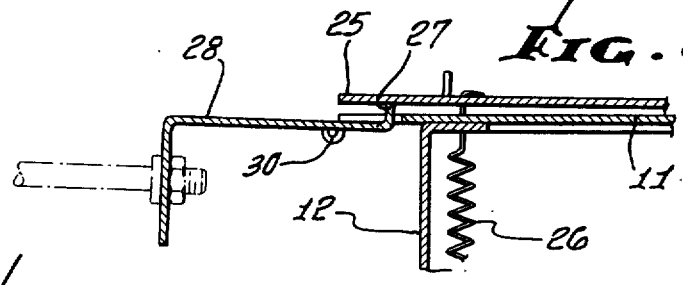
FIG. 5 is view like FIG. 4 through rocker arm.
Figure 6:
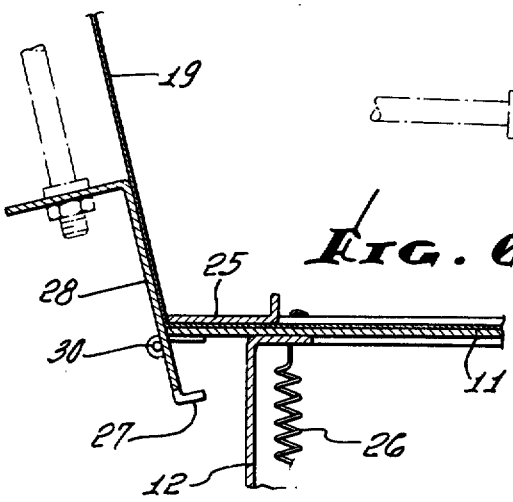
FIG. 6 same as FIG. 4 but different folding position.
Figure 2:
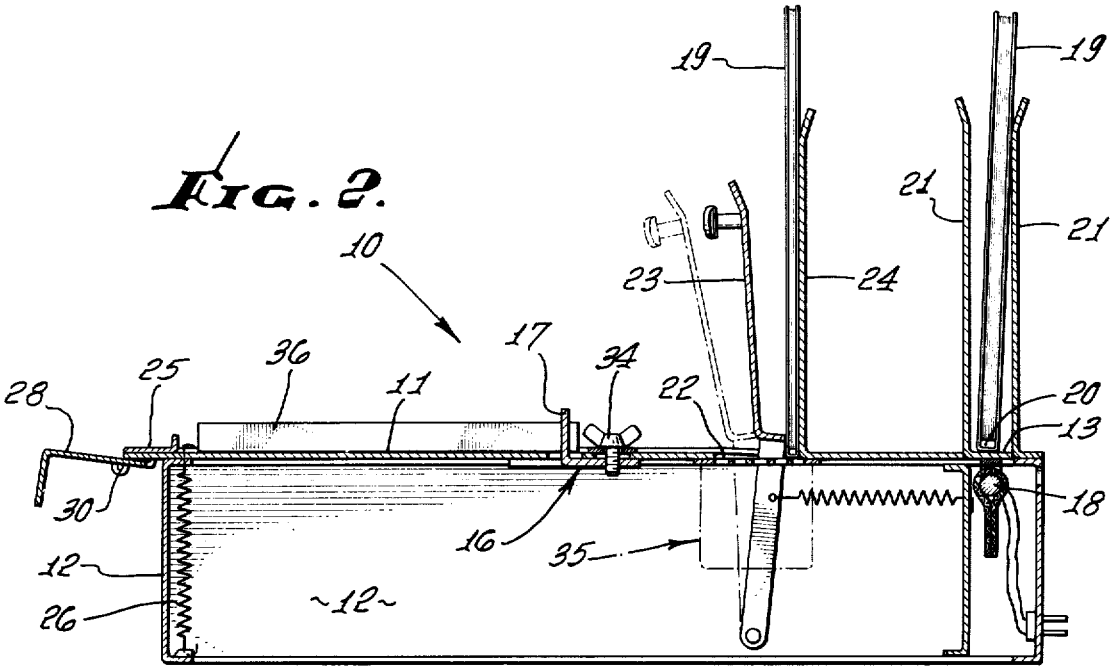
FIG. 2 is a section taken along the plane 2—2 of FIG. 1.
Figure 3:
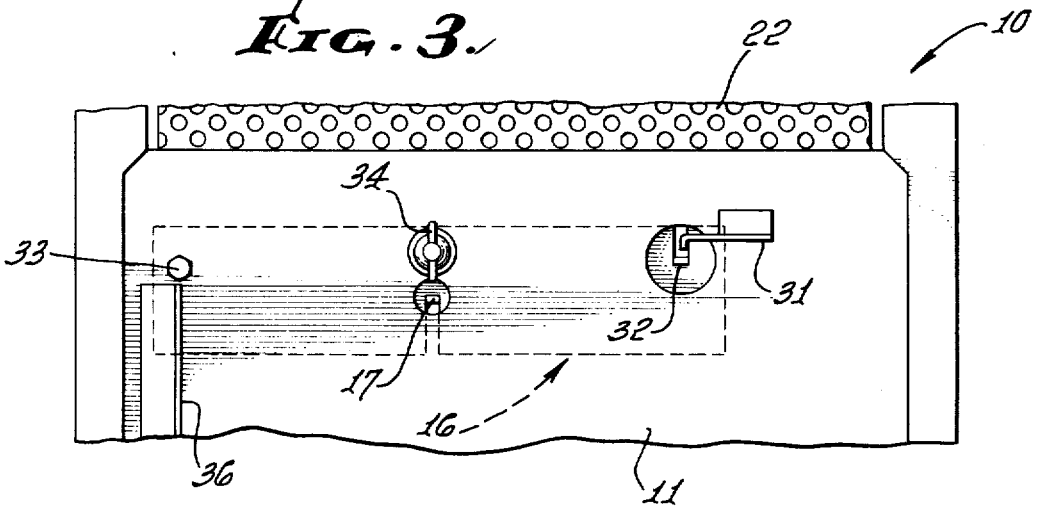
FIG. 3 is a view taken along the center of FIG. 2.
Figure 7:
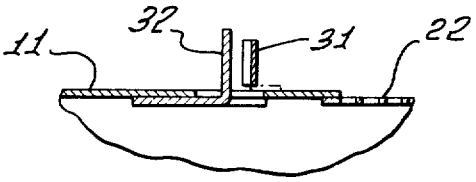
FIG. 7 along plane 7—7 of FIG. 1.

In FIG. 1, the binding machine 10 comprises a base plate 11, four supporting side panels 12, a heating rack 13 to heat the adhesive through the cover, a cooling rack 14 to cool and harden the adhesive, a folding mechanism 15 to fold the book cover, a device for measuring the thickness of collated pages to be bound 16, a back stop 17 automatically adjusted by the measuring device 16 to position the book cover to the proper position for folding by the folding mechanism 15.

The heating rack 13 comprises an electric heating element 18 having a flat upper side capable of maintaining a temperature sufficient to permit heat to permeate a book cover 19 and melt the severable strip of hot melt bending adhesive 20 but within a heat range lower than the scorching temperature of typical book cover paper, cloth or other book cover material. The heating rack 13 is equipped with vertical supporting panels 21 to generally position a folded book cover 19 in proper position for the melting of the adhesive 20.

The cooling rack 14 comprises a ventilated base 22 permitting air pressurized by blower 35 to flow upward over the outside of the book cover 19 cooling the binding edge of the book cover 19 and the hot melt adhesive 20; a spring loaded pressure plate 23 capable of pivoting forward and aft serving the dual purpose of supporting the book cover 19 tightly together at the base, during the cooling period, and generally aligning the outer edges of the book cover 19 in proper configuration during the cooling period; and a back plate 24 to support the tension of the spring loaded pressure plate 23 through the book cover 19 being bound.

The folding mechanism 15 comprises an alignment bar 36, a clamp bar 25 to clamp the unfolded book cover to the base plate 11 during the process of folding, and a means of raising and lowering said clamp bar 25 acting against the clamp bar springs 26 by rocker arms 27 mounted on the folder bar 28, said rocker arms producing a lifting effect upon the clamp bar when the folder bar handle 29 is depressed downward, raising the clamp bar 25 sufficiently to permit an unfolded book cover to be inserted between the base plate 11 and the clamp bar 25, the clamp bar 25 gripping the unfolded book cover to the base plate 11 when the folder bar handle 29 is released or when the folder bar handle 29 is raised to accomplish folding of the book cover.

The book cover may be single folded providing only one or a few sheets of book pages are to be bound. In the event of binding a book having more than a few pages, the book cover must be folded twice by inserting the cover into the folding mechanism 15, folding by raising the folder bar handle 29, then removing the cover from the folding mechanism 15 and inserting the end of the book cover opposite the end previously inserted and raising the folding bar handle 29 a second time. The folding is accomplished by the folder bar 28 pivoting on the folder bar hinges 30, bending the book cover around the clamp bar 25.

The unfolded book covers to be used are of a standard size to function properly in the binding machine as to the automatic placement of the unfolded book covers in the folding mechanism 15. The automatic placement of the covers in the folding mechanism 15 for either a single or double fold is accomplished by the thickness measuring device 16 which consists of a stationary pin 31 mounted to the base plate 11 and a movable pin 32 mounted to a plate pivoting on a pivot 33. The collated pages to be bound are placed between the stationary pin 31 and the movable pin 32; the set screw 34 is loosened permitting the movable pin 32 to be moved to and press on the collated pages to be bound backed against the stationary pin 31. While in this position, the set screw 34 is tightened and the back stop 17 will automatically have moved to the correct position to properly place the unfolded book cover in the folding mechanism 15 when the unfolded book over is pushed back against the back stop 17. This utomatic alignment of the back stop 17 will result in a ingle fold being properly placed in the center of the nfolded book cover, when only a few pages are to be ound. When the movable pin 32 and the stationary pin 1 are contiguous, the standard cut unfolded book over is positioned in the folding mechanism 15 so as to old in the center of the book cover. As the movable in 32 is moved away from the stationary pin 31, as in ne case of measuring collated pages having consider- ble thickness, the back stop 17 moves toward the olding mechanism 15 by a factor of one half the dis- ance the movable pin 32 moves. When the paper is ouble folded, the distance between the two folds quals the distance between the movable pin 32 and he stationary pin 31, thereby adjusting the back stop 7 in such a way as to align the unfolded book cover to ccommodate the thickness of the collated material to e bound.

Figure 8:
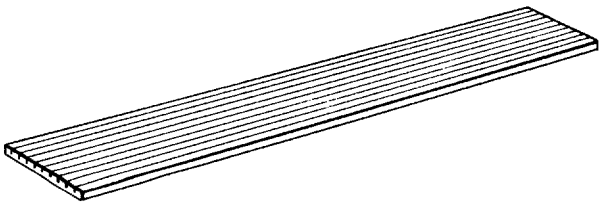
FIG. 8 is a detailed view of a severable strip of hot melt binding adhesive in cool state.

FIG. 8 is a detail of the configuration of the cool hard tate of the adhesive prior to its use in binding. Al- hough the configuration of the adhesive to be inserted nto a folded cover may be that of round rods, many ided rods, beads, droplets, sphears, pyramids, crysta- ine shape or dust granule, granules, or sand, the con- iguration shown in FIG. 8 comprises a sheet or ribbon, erforated, or slit not quite through the sheet or ribbon it intervals approximating those that if the ribbon or heet were manually torn through each slit, a multiplic- ty of square shaped rods would be produced. By tear- ng through along any selected slit, or row of perfora- ions, a portion of the sheet or ribbon may be removed rom the remainder in one piece, the width of said iece approximating the thickness of the collated pages o be bound. Such a piece may be inserted into the olded book cover and the collated pages to be bound nay be placed thereon.

What I claim as new and desire to secure by Letters Patent of the United States is:

1. A book binding apparatus for folding book covers and melting adhesive comprising in combination a means of measuring the thickness of assembled inside pages of a book to be bound by placing the assembled pages within a measuring device having parts capable of being moved so as to make contact with the collated pages to be bound, means of securing the parts in stationary configuration separated from each other by the distance equal to the thickness of the collated pages to be bound, means of mechanically linking the parts of the measuring device to an obstruction limiting the distance through which an unfolded book cover may be inserted into the folding device so as to adjust the unfolded cover into proper position for single or double folding to fit the cover to the assembled pages, means of clamping the cover to hold firmly in position while folding, means of folding the book cover, means of applying heat to the outside of the binding edge of a cover of an assembled book to be bound, and means of supporting the book so as to locate the binding edge exposed to the heat source while supporting the book cover and pages in proximity to each other.

2. A book binding apparatus, comprising in combination, means of measuring the thickness of assembled inside pages of a book to be bound by placing the assembled pages within a measuring device having parts capable of being moved so as to make contact with the assembled pages to be bound, means of securing the parts in stationary configuration separated from each other by the distance equal to the thickness of the assembled pages to be bound, means of mechanically linking the parts of the measuring device to an obstruction limiting the distance through which an unfolded book cover may be inserted into a folding device so as to adjust the unfolded cover into proper position for single or double folding to fit the cover to the assembled pages, means of clamping the unfolded cover to hold firmly in position while being folded, means of folding the book cover material, means of applying heat to the outside of the binding edge of an assembled book to be bound, and means of supporting the book so as to locate the binding edge exposed to the heat source while supporting the book cover and pages in proximity to each other, a cooling rack with means of extracting heat from a heated book and binding adhesive, means of supporting the book so as to properly locate the binding edge exposed to the means of extracting heat, and means of compressing the cover and the pages of the book into proximity to each other while cooling the book and adhesive, thereby hardening the adhesive.

3. A method of binding book pages to each other and to a book cover to form a book, by placing in the inside of the binding edge of a book cover, an adhesive substance in a cool, semi solid state, the adhesive substance having the characteristics of melting to liquid state when heated and returning to semi solid state when cooled, inserting the assembled pages of the book to be bound into the book cover so as to contact the semi solid adhesive substance, and heating the adhesive substance to molten state by the application of heat to the outside of the binding edge of the book cover, melting the adhesive substance by heat transference through the book cover thereby binding the pages to each other and to the book cover, utilizing a book binding apparatus, comprising in combination, means of measuring the thickness of assembled inside pages of a book to be bound by placing the assembled pages within a measuring device having parts capable of being moved so as to make contact with each side of the assembled pages to be bound, means of securing the parts in stationary configuration separated from each other by the distance equal to the thickness of the assembled pages to be bound, means of mechanically linking the parts of the measuring device to an obstruction limiting the distance through which an unfolded book cover may be inserted into the folding device so as to adjust the unfolded cover into proper position for single or double folding to fit the cover to the assembled pages, means of clamping the cover to hold firmly in position while folding, means of folding the book cover material, means of applying heat to the outside of the binding edge of an assembled book to be bound, and means of supporting the book so as to locate the binding edge exposed to the heat source while supporting the book cover and pages in proximity to each other, a cooling rack with means of extracting heat from a heated book and binding adhesive, means of supporting the book so as to properly locate the binding edge exposed to the means of extracting heat, and means of compressing the cover and the pages of the book into proximity to each other while cooling the book and hardening the adhesive.

4. A book cover folder adjustment apparatus to automatically limit the distance past a folding mechanism a book cover to be folded, pre-cut to dimensions for use in the apparatus, may be moved until contacting an obstruction thereby adjusting the book cover in position for folding by the folding mechanism with one fold in the event the pages of the book to be bound number one or a few, or folded with two folds to accommodate a thickness of the book pages requiring more than one fold, comprising in combination an obstruction mounted on a pivotable device and centered thereon midway between the pivot of the device and a measuring feeler also mounted on the pivotable device, the measuring feeler being located between the folding mechanism and a stationary feeler immovably mounted a fixed distance from the folding mechanism, the measuring feeler being capable of movement through an arc having as its center the pivot of the pivotable device from a position contiguous to the stationary feeler to a position on the arc closer to the folding mechanism so that movement of the measuring feeler toward or away from the stationary feeler in measuring the thickness of the pages to be bound results in movement of the obstruction toward or away from the folding mechanism by a factor of approximately one-half the distance moved by the measuring feeler, thereby adjusting the obstruction and the pivotable device to a position where it may be locked a stationary distance from the folding mechanism so as to permit a book cover when inserted and touching the obstruction to be positioned at the folding mechanism so as to fold once in the center of the cover, if single folded, or to fold twice by inserting the cover in reverse position, and folding a second time, the two folds separted from each other by approximately the thickness of the pages to be bound.

*5. A method of binding a book comprising:*

*providing a book cover having a binding edge, a plurality of unbound pages within the book cover, and an adhesive between the binding edge and the pages with the pages closely adjacent the adhesive, said adhesive being at least semi-solid;*

*positioning the book cover with the pages therein in a generally upright position at a first station whereby the book cover has an upper end and a lower end, said binding edge being at one of said ends;*

*applying sufficient heat to the book cover to heat the adhesive through the book cover and to cause the adhesive to flow so that it can bind the pages to the book cover;*

*carrying out said step of applying with the book cover and the pages in said generally upright position at said first station;*

*moving the book with the pages therein from said first station subsequent to said step of applying to a second station; and*

*allowing the adhesive to harden sufficiently so that it retains the pages within the book cover, at least a substantial portion of said step of allowing being carried out of said second station.*

*6. A method as defined in claim 5 wherein said step of applying is carried out with the book cover being loosely retained in the region of the book cover which contains the adhesive.*

*7. A method as defined in claim 5 including clamping the book cover and the pages during at least a portion of said step of allowing.*

*8. A method of binding a book comprising:*

*providing an upwardly opening receiver, said receiver having a bottom;*

*providing a book cover having a binding edge, a plurality of pages to be bound and an adhesive, said adhesive being at least semi-solid;*

*placing the book cover, the pages, and the adhesive in the receiver through the open upper end thereof with the pages being within the book cover and with the adhesive being between the binding edge and the pages, said pages extending downwardly toward the binding edge and being closely adjacent the adhesive;*

*supporting the binding edge on the bottom of the receiver;*

*applying sufficient heat to the book cover adjacent the bottom of the receiver to heat the adhesive through the book cover and to cause the adhesive to flow so that it can join the pages to the book cover; and*

*allowing the adhesive to solidify sufficiently so that it retains the pages within the book cover.*

*9. A method as defined in claim 8 wherein said step of applying is carried out without mechanically squeezing the book cover in the region of the book cover which contains the adhesive.*

*10. A method as defined in claim 8 wherein said step of positioning includes positioning the book cover and the pages therein in a generally upright position with the binding edge being the lowest edge of the book cover.*

*11. A method as defined in claim 8 wherein said step of applying is carried out at a first station and includes moving the book with the pages therein from said first station subsequent to said step of applying to a second station, said step of allowing being carried out at said second station.*

*12. A method as defined in claim 8 wherein said step of applying is carried out without mechanically squeezing the book cover in the region of the book cover which contains the adhesive, said step of applying is carried out at a first station, said method including moving the book with the pages therein from said first station subsequent to said step of applying to a second station and said step of allowing is carried out at said second station.*

*13. A method as defined in claim 8 wherein said step of applying is carried out with the book cover being loosely retained by the receiver.*

*14. An apparatus for binding a plurality of pages to a book cover to form a book wherein the book cover has a binding edge and adhesive is located between the binding edge and the pages, said apparatus comprising:*

*supporting means;*

*first means carried by the supporting means responsive to the thickness of the pages to be bound for locating a position on the book cover along which the book cover should be folded in order to appropriately receive the pages whereby the book cover can be properly folded;*

*a heating element;*

*second means for mounting the heating element on the supporting means; and*

*third means on the supporting means for supporting the folded book cover and the pages adjacent the heating element whereby the heating element can heat the adhesive.*

*15. An apparatus as defined in claim 14 including fourth means on the supporting means for measuring the thickness of the pages to be bound, said first means being responsive to said fourth means to locate said position on the book cover.*

*16. An apparatus as defined in claim 14 wherein said fourth means includes first and second relatively movable members on the supporting means adapted to have the pages to be bound positioned therebetween.*

* * * * *